(12) United States Patent
Lappe et al.

(10) Patent No.: US 8,494,764 B2
(45) Date of Patent: Jul. 23, 2013

(54) METHOD AND SYSTEM FOR COORDINATING THE ROUTES OF A PLURALITY OF NAVIGATION DEVICES

(75) Inventors: Dirk Lappe, Karlsruhe (DE); Stefan Wolf, Schwieberdingen (DE); Hermann Dibos, Remchingen (DE); Guido Hovestadt, Wickede-Ruhr (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 316 days.

(21) Appl. No.: 10/562,083

(22) PCT Filed: Jun. 24, 2004

(86) PCT No.: PCT/EP2004/006858
§ 371 (c)(1),
(2), (4) Date: Jul. 23, 2007

(87) PCT Pub. No.: WO2005/001386
PCT Pub. Date: Jan. 6, 2005

(65) Prior Publication Data
US 2008/0046173 A1    Feb. 21, 2008

(30) Foreign Application Priority Data
Jun. 27, 2003 (EP) .................................. 03014761

(51) Int. Cl.
*G01C 21/00* (2006.01)
(52) U.S. Cl.
USPC ........... 701/422; 701/423; 701/426; 701/465; 340/995.19
(58) Field of Classification Search
USPC .................. 701/200, 207, 209, 400, 408, 409, 701/410, 420, 421, 422, 423, 425, 426, 427, 701/428, 431, 438, 465, 468; 340/995.1, 340/995.19
See application file for complete search history.

(56) References Cited

U.S. PATENT DOCUMENTS

| | | | |
|---|---|---|---|
| 5,818,356 A | 10/1998 | Schuessler | |
| 6,424,910 B1 * | 7/2002 | Ohler et al. | 701/202 |
| 6,571,174 B2 | 5/2003 | Rigazio | |
| 6,577,949 B1 * | 6/2003 | Robinson et al. | 701/209 |
| 6,618,593 B1 * | 9/2003 | Drutman et al. | 455/456.3 |
| 6,745,123 B1 | 6/2004 | Petzold et al. | |
| 6,944,443 B2 * | 9/2005 | Bates et al. | 455/414.2 |
| 6,975,873 B1 * | 12/2005 | Banks et al. | 455/456.5 |
| 7,058,507 B2 * | 6/2006 | Saiki | 701/207 |
| 2002/0004700 A1 * | 1/2002 | Klein | 701/200 |
| 2002/0077746 A1 * | 6/2002 | Zuber et al. | 701/209 |
| 2004/0021583 A1 * | 2/2004 | Lau et al. | 340/995.19 |
| 2004/0049335 A1 * | 3/2004 | Schmidt et al. | 701/201 |

FOREIGN PATENT DOCUMENTS

| | | | |
|---|---|---|---|
| JP | 2004294342 | * | 3/2003 |
| JP | 2003-130655 | | 8/2003 |

OTHER PUBLICATIONS

JP 10-281782 Translation.*

* cited by examiner

*Primary Examiner* — Thomas Black
*Assistant Examiner* — Ce Li
(74) *Attorney, Agent, or Firm* — O'Shea Getz P.C.

(57) ABSTRACT

The data exchange between two or more navigation devices allows a highly automated coordination of routes of navigation devices. The calculation of a route may be based on the GPS data and additionally on the positional data received from another navigation system to provide, for example, for a rendezvous function with a minimum activity from the users of the navigation devices.

6 Claims, 2 Drawing Sheets

Figure 1:
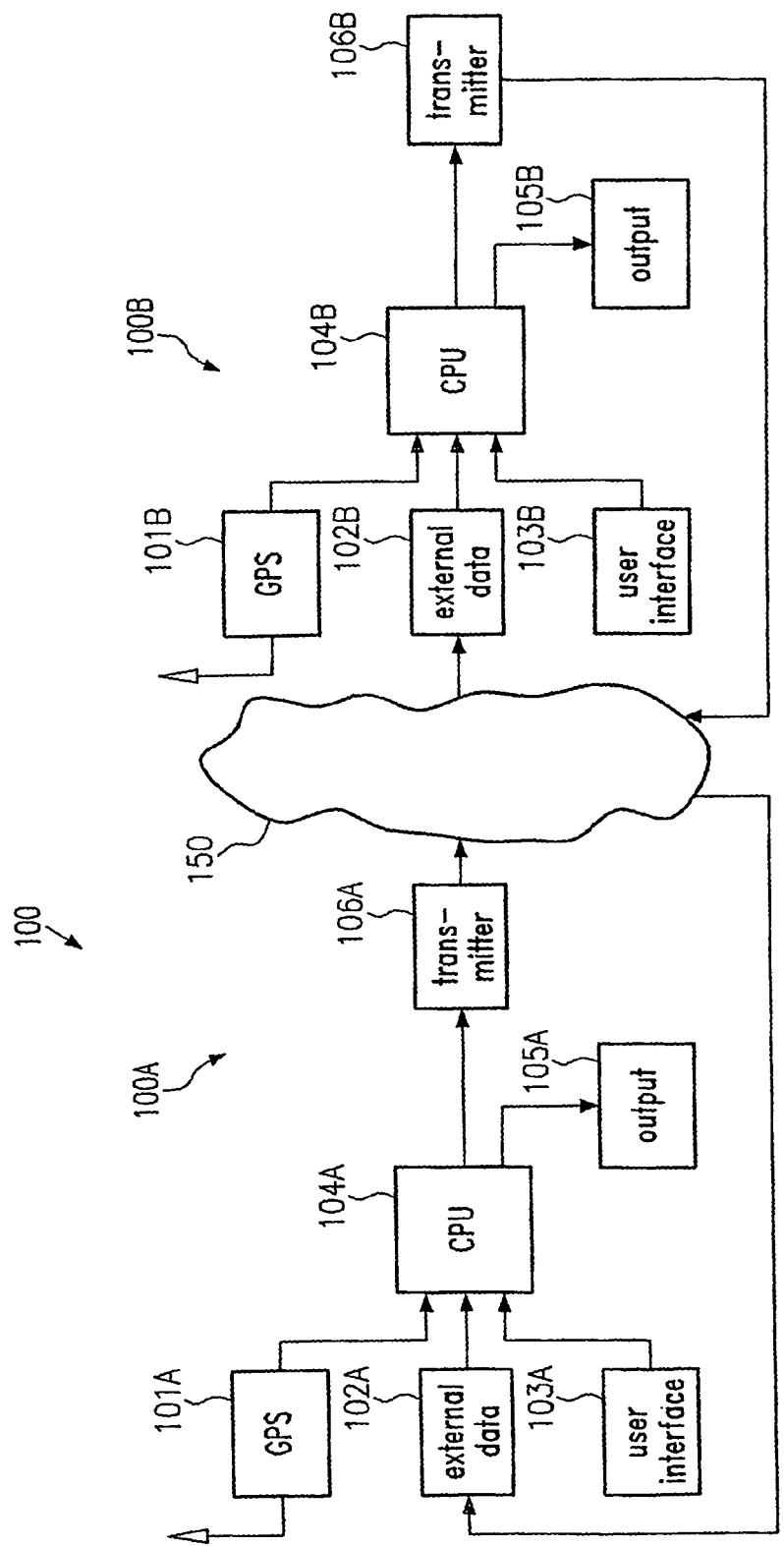

METHOD AND SYSTEM FOR COORDINATING THE ROUTES OF A PLURALITY OF NAVIGATION DEVICES

This application claims the benefit of priority from European Application No. 03014761.5, filed Jun. 27, 2003 and PCT Application No. PCT/EP2004/006858, filed Jun. 24, 2004 which this application incorporates herein by reference.

The present invention generally relates to navigation devices that may be based on position signals delivered by a plurality of satellites, or that may be based on other appropriate positioning systems, wherein a route of the navigation device, which may in typical applications, be installed in a vehicle, is then calculated on the basis of the satellite signals or other position relevant information, allowing the determination of the current position of the navigation device, and on the basis of a route endpoint entered into the navigation device.

Recent developments in the field of microelectronics have enabled the production of miniature HF (high frequency) receiver devices with a small size and at moderately low cost. Thus, deploying the potentiality offered by the global positioning system (GPS) satellites has become an attractive feature for a plurality of applications, such as navigation devices usable in vehicles or as small mobile entities that may be used in many fields, such as air sport activities or any other outdoor activities. Basically, the navigation devices are configured to calculate the current position of the navigation device as long as the signals of a plurality of satellites are received. These signals include positional and timing data of the satellites, enabling the navigation device to determine its current position within an accuracy of currently approximately 5 meters with respect to horizontal directions and approximately 15 meters in the vertical direction. Many of the navigation devices further comprise a user interface to enter the position, in the form of GPS coordinates and/or in the form of other identifications, such as street names, and the like, of one or more destinations, wherein the navigation device then calculates, on the basis of the current position and a map stored in a storage medium that is connected to or provided within said navigation device, a route to guide the user to the one or more destinations. In other navigation devices the one or more routes may be entered in advance and the current position of the navigation device is compared with the initially entered route, wherein a deviation may be reported to the user.

In other types of navigation systems, the determination of the route or portions thereof may take place at an external device, for instance a server computer, which receives and communicates data from and to the navigation system. For instance, the data communication may be accomplished by a mobile phone.

Depending on the specific application the navigation device is designed for and on the precision of the stored map data, routes may be calculated and reported to the user with a desired accuracy so as to guide a user reliably to a destination. For instance, navigation devices used in ground vehicles may provide sufficiently accurate guidance for the driver to safely navigate within cities. Although conventional navigation devices offer a lot of advantages for users, there is still room for improvement, when the coordination of a routes of various users is required.

It is therefore an object of the present invention to provide a method and a navigation device that enable to facilitate the coordination of one or more navigation devices.

According to one aspect of the present invention a method comprises receiving a first set of data from global positioning system satellites by a first navigation device, and receiving a second set of data from a second navigation device by the first navigation device, wherein the second set of data includes data representing a current position of the second navigation device. Moreover, first positional data are calculated in the first navigation device on the basis of the first set of data and the second set of data so as to specify a route of the first navigation device.

The method specified above enables the calculation of positional data, for instance in suggesting a route for the user of the first navigation device, on the basis of its own current position and on the basis of the current position of a second navigation device, thereby imparting the user of at least the first navigation device an increased degree of flexibility in a planning a route compared to conventional techniques. For example, the calculation of the first positional data, which may represent one or more intermediate points of a route to a specified destination, or which may represent the destination of a newly-proposed route, allows to take into consideration the position or position relevant data of the second navigation device, thereby enabling the coordination of two navigation devices, for instance in the form of a "search" function or a "rendezvous" function. That is, the first positional data may be determined so as to provide a route having a common rendezvous point with a route of the second navigation device. The calculation of positional data on the basis of internal position data and on the basis of positional data received by an external navigation device may be advantageous in a plurality of applications, such as in navigating ground vehicles, boats, various types of aerodynes that are usually operated without radar and/or radio-based guidance systems, hiking and other outdoor activities, wherein the inventive method is particularly useful in driving motor cars, since route coordination may be achieved with a minimum amount distraction of the driver.

In a further preferred embodiment, the method further comprises transmitting a third set of data from the first navigation device to the second navigation device, wherein the third set of data includes at least a portion of the calculated first positional data.

The transmission of the positional data, or at least a portion thereof, to the second navigation device further increases the flexibility in coordinating the routes suggested by the first and the second navigation device, since the positional data may include information relating to a common rendezvous point or a common destination so as to enable both the first and the second navigation device to calculate respective optimum routes independently on the basis of the common rendezvous point or destination. The determination of the individual routes may be based various criteria such as distance of each of the navigation devices from the common rendezvous point, estimated time required to get to the rendezvous point, average speed of the vehicle or individual the navigation device is associated with, and the like. Information specifying one or more of these criteria as well as a flag indicating the criterion that is actually to be used in determining the route may also be provided with positional data transmitted to the second navigation device.

In another preferred embodiment, the method further comprises transmitting a request signal from the first navigation device to the second navigation device to initiate transmission of the second set of data. The transmission of the request signal may enable to control the data exchange between the first and the second navigation devices, wherein the transmission may, for example, occur upon user request to arrange for a "meeting" at a rendezvous point that may be selected automatically by the first or the second navigation device, or that may be selected by the user. Moreover, the transmission of the request signal may be performed automatically in the context of a specific operating mode of the navigation device. For instance, an operating mode may be implemented In the first navigation device that initiates the issuance of a request signal to one or more other navigation devices once or repeatedly in accordance to conditions specified in the operating mode to receive the corresponding second data sets of the one or more other navigation devices. The positional data calculated by the first navigation device may then be transmitted to the one or more further navigation devices to coordinate the respective routes, for example, in view of a rendezvous point. The request signal may also contain additional information relating to the further data handling and/or the calculation of positional data in the second navigation device. In particular, the request signal may include an identification that enables the receiving navigation device to identify the calling party and/or the desired type of data transfer and data processing. The identification may be user defined or may correspond to a generally acknowledged standard.

In a further advantageous embodiment, the method further comprises transmitting a confirmation signal by the second navigation device to acknowledge data communication with the first navigation device.

In this way a reliable data transfer may be accomplished, wherein the confirmation signal may include data to approve of the data transfer with the first navigation device prior to transmitting the second data set to the first navigation device. Moreover, the confirmation signal may contain the second data set and may additionally comprise further data relevant for the further data communication and/or the calculation of the first positional data in the first navigation device. For example, the confirmation signal may contain an identification to enable the receiving navigation device to identify the sender of the confirmation signal. The identification may be user defined or may correspond to a generally acknowledged standard.

According to still another preferred embodiment, the first positional data represents at least one common point of a proposed route for the first and the second navigation device. Thus, a rendezvous point may reliably be reached irrespective of the current position of the first and the second navigation devices. As previously explained, the at least one common point may be determined on the basis of various criteria. For instance, for ground vehicles the at least one common route point may be calculated such that both vehicles have substantially to cover the same distance. In other cases, it may be advantageous to determine the at least one common route point so as to substantially divide the time interval required for the vehicles to get to the common route point according to a desired ratio; for example, both vehicles may require substantially the same time. In a further variant, the first and the second vehicle may be guided to the common route point such that only a minimum detour from the initial routes of the first and second vehicles is necessary. The present invention is particularly advantageous in conjunction with navigation devices used in ground vehicles, since the mutual communication of the navigation devices instead of the direct communication of the vehicle drivers significantly secures the driving of vehicles especially in situations of dense traffic. However, the communication of navigation devices for route coordination according to the present invention is also advantageous in many other applications, such as hanggliding, paragliding, hiking, biking, small airplanes, boats, and the like.

In a further embodiment the method additionally comprises calculating second positional data in the second navigation device on the basis of the current position of the second navigation device and the third set of data.

The calculation of the second positional data on the basis of the third data set received from the first navigation device allows a reliable route coordination of the first and second navigation devices. In a simple example, the third data set may represent coordinates of a rendezvous point suggested by the first navigation device. In other cases, the third data set may include additional information such as current speed and/or current position and/or desired type of coordination between routes of the first navigation device and the second navigation device. For instance, the coordination of the routes may not necessarily aim in calculating a rendezvous point, but may on the contrary be selected so as to "avoid" contact of the individual navigation devices, for instance for vehicles moving in conditions with reduced visibility and having the same destination or intermediate points in their routes.

In still another preferred embodiment the method further comprises receiving an updated version of the second set of data and calculating the first positional data on the basis of the updated second set of data.

The calculation of the first positional data, which may, for example, represent a common point in the routes of the first and second navigation device, on the basis of updated second data enables the first navigation device to track the second navigation device and to respond to a change of the situation, for example traffic jam, and the like. The updating of the second data may also include a request for modifying the presently established status of data communication between the first and the second navigation device. For example, the cooperativeness for route coordination may be cancelled. The updating of the second data set may be performed on the basis of parameter represented by an automated operating mode of the second navigation device, or may be initiated upon user request.

It should be noted that the above explained embodiments may applied to more than two navigation devices, wherein preferably the navigation devices have substantially the same functions that allow the performance of some or all of the functions explained above or described later on in this description. Due to the possible "symmetry" of the plurality navigation devices with respect to some or all of the functions regarding the route coordination in some advantageous embodiments the method may further comprise the selection of a master device that outputs the first positional data coordinate the routes of the other devices. For example, the master device may be the device that first transmits a request signal for a coordination procedure to other devices, which, in turn, are then identified as "slave" devices upon confirming the readiness for route coordination by emitting a confirmation signal.

According to another aspect of the present invention a method of coordinating routes of a plurality of navigation devices comprises transmitting position data of each of the plurality of navigation devices via a network to a host device, wherein the position data includes at least a destination of each route and the current position of each navigation device. Furthermore, at least one intermediate position for each route of the plurality of navigation devices is determined by the host device, and the at least one intermediate position for each route is transmitted to the respective navigation device associated with a specific one of the routes.

The calculation of intermediate positions for each route is advantageous in that the host unit may communicate intermediate destinations determined with respect to predefined criteria or parameters to each of the navigation devices, wherein each route is specified by at least the current position of the respective navigation device and its desired final destination. Thus, the host unit may coordinate the routes of the plurality of navigation devices based on the predefined parameters. For instance, the routes of ground vehicles may be coordinated such that an estimated time period for reaching the final destination is minimal. This may be advantageous, when a large number of vehicles is involved in the route coordination process, wherein many of the vehicles may have the same or a similar final destination. However, the route coordination process may be based on any other predefined criteria or parameters that are considered appropriate.

In one example, the host device, which may be comprised of a plurality of server computer linked by a network, may determine a rendezvous position for two or more navigation systems upon request to do so. Moreover, the host device may calculate in detail the route to the rendezvous point for each associated navigation device, wherein the route may be checked and updated on the basis of additional information, such as traffic information, and the like. Since the detailed route calculation is performed by the host device, the navigation devices may be of simple configuration that merely support data communication with the host device.

In other embodiments, the host unit may be connected to a service provider that supplies additional information and/or provides for the computational capability required to coordinate the routes of a large number of navigation devices. The additional information may concern the current global traffic situation, the weather situation and its future development, and the like. The service provider may further take care of an efficient communications network to ensure a high degree of reliability during the data communication between the host unit and the plurality of navigation devices. Due to the position data provided by the plurality of navigation devices and the additional information the host unit may respond in an appropriate manner, wherein in some embodiments the "type" of response of the host unit may be selectable by the users of the navigation devices. For instance, some user may prefer a convenient journey in a scenic country side when being guided to their final destination, whereas others may prefer a time efficient ride, wherein in both cases the currently prevailing traffic generated by the plurality of vehicles is taken into consideration. In this way, the method is extremely responsive and flexible. This method may also advantageously be applied within cities, wherein the host unit may recognize immediately traffic jams or slowly moving traffic on the basis of position data and/or speed data received from the plurality of navigation devices. By providing route alternatives to the plurality of navigation devices with respect to the current situation and the future development of the situation, which now is largely determined by the host unit, an efficient coordination may be accomplished.

In a further embodiment, the calculation of positional data in some or each of the navigation devices may be based on the at least one intermediate position so as to maintain a high degree of "independence" from the host unit. The intermediate position determined and provided by the host unit may be used as a parameter representing the amount of influence of other navigation devices on the route of the navigation device under consideration. The independent calculation of the route in each navigation device while taking into account the intermediate position allows a moderately efficient coordination of all navigation devices at a reasonable effort at the host and network side.

According to another aspect of the present invention a navigation device comprises a first receiving section configured to receive and decode a first signal from one or more GPS (global positioning system) satellites, and a second receiving section configured to receive and decode a confirmation signal for communication with an external device, a request signal for communication with an external device and external positional data via a communications network. The navigation device further comprises a calculation unit configured to calculate, upon receipt of the confirmation signal by the second receiving section, positional data for a route of the navigation device on the basis of the first signal and the external position data. Furthermore, a transmission section is provided in the navigation device that is configured to encode the confirmation signal, the request signal and the positional data and to output a signal representing the request signal and/or the positional data via the communications network.

The navigation device constructed in the above manner is able, due to the second receiving section and the transmission section, to receive and communicate request and confirmation signals to external devices, which are preferably other navigation devices of similar structure. This feature allows a data communication between the navigation device and the external device, wherein the external positional data received by the navigation device provide for the possibility of coordinating the determination of the route of the navigation device in accordance with the external positional data.

In a preferred embodiment the second receiving section and the transmission section each comprise an interface for wireless communication with external devices according to a specified data communications standard. The wireless interface imparts maximum flexibility to the navigation device, since data communication may be accomplished with a plurality of external device without cumbersome installation of cables, connectors, and the like. The wireless interface may comprise infra-red receiver and transmitter units and/or RF receiver and transmitter units that allow data communication with compatible external devices. In particular, the wireless interface enables the communication of a plurality of navigation devices by means of a radio network without necessitating the intermediation of other network components when the involved navigation devices are within the "range" of the wireless interfaces.

In other examples, an interface is provided that enables the communication with a mobile phone so as to communicate a request signal and to receive a confirmation signal and external positional data. In this way, existing communication devices may effectively be used with the present invention, thereby achieving a cost-effective navigation device.

In still another embodiment, the second receiving section and the transmission section include all the components required to use one or more mobile phone networks. Thus, the navigation device may independently from further external network components communicate with other navigation devices using the well-established infra-structure of the mobile phone network world. The request signal may thus in one example be represented by dialing the number of the desired external navigation device, whereas the actual establishing of the connection may act as the confirmation signal.

In a preferred embodiment the calculation unit is configured to calculate the positional data on the basis of geographical data representing a road map. Thus, the navigation device is especially suited for being used in road vehicles, thereby allowing a route coordination between two or more vehicles, for example in the form of a rendezvous function.

In still another preferred embodiment the navigation device further comprises a user interface configured to report the receipt of the request signal to a user, and to initiate the transmission of the confirmation signal upon user request. The user interface enables the initiation of the route coordination process, wherein the initiation process may immediately be started upon operating the user interface, and/or a specified "behaviour of the navigation device may be selected by the user in advance, by storing respective instructions in a corresponding memory device included in the navigation device. For instance, the "rendezvous" function may be activated for a first car upon the receipt of a request signal without notification of the driver. A second navigation device, receiving the confirmation signal of the first navigation device, may then readily calculate "rendezvous" positions on the basis of the data received from the first car. This may be used as an effective technique for "finding" stolen cars.

In other embodiments, the user interface is configured to minimize the number of user activities required for route coordination of the navigation device. For instance, the entering of commands may be accomplished by few or even a single button so as to minimize the distraction of a car driver. Additionally or alternatively the user interface may be configured to accept and decode voice commands.

According to still another aspect of the present invention a navigation system comprises a first and a second navigation device, and further comprises a host unit configured to receive positional data from the first and the second navigation devices, calculate first and second proposed positional data for the first and second navigation devices, and to communicate the first proposed positional data to the first navigation device and the second proposed positional data to the second navigation device to coordinate a route of the first and second navigation devices.

Thus, the host unit allows an effective coordination of routes of a plurality of navigation devices.

In one preferred embodiment the host unit is implemented in a navigation device additionally having the features of the first and second navigation devices, thereby facilitating the coordination of routes when more than two navigation devices are involved. Preferably, the first and the second navigation each comprise corresponding host units so as to provide "symmetry" between the individual navigation devices, wherein the host units are configured so as to select a "master" unit for a corresponding coordination process. For instance, the navigation device sending the request signal to a plurality of other navigation devices may activate its host unit, whereas the corresponding host units of the residual navigation devices remain inactive.

In another preferred embodiment the host unit is connected to a service provider. In this way, the host unit may be equipped with sufficient computational power and communication resources to coordinate a large number of navigation devices.

Figure 2:
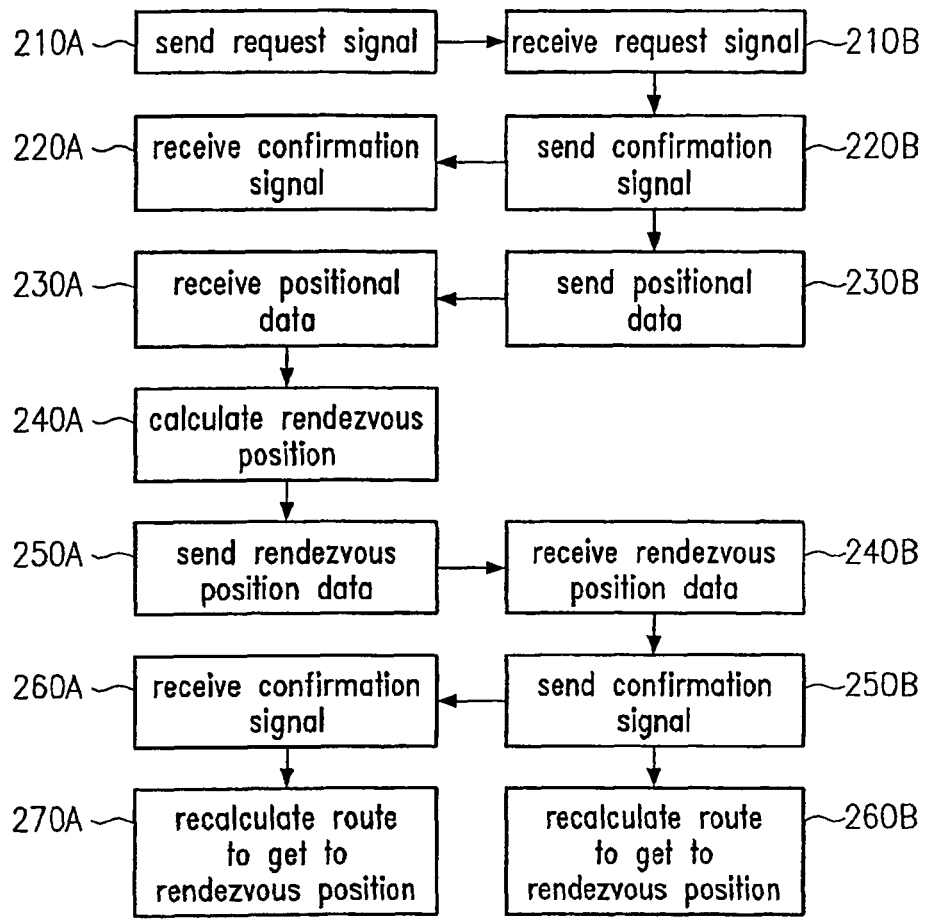
Figure 3:
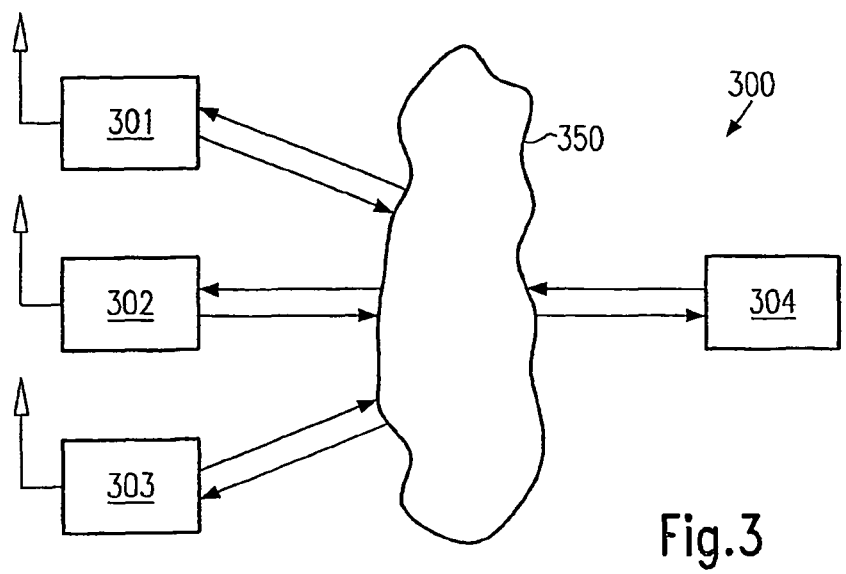

Further embodiments of the present invention will now be described in more detail with reference to drawings, in which:

FIG. 1 schematically depicts a first and a second navigation device adapted for route coordination according to illustrative embodiments of the present invention;

FIG. 2 shows a flow chart representing an example for operating the system depicted in FIG. 1; and FIG. 3 schematically illustrates a system for coordinating a plurality of navigation devices by a host unit according to another illustrative embodiment of the present invention.

In the following detailed description it is referred to navigation devices mounted in ground vehicles, such as passenger cars, vans, trucks, and the like, since the present invention is especially advantageous in this situation due to the increase in safety provided by the highly automated procedure of coordinating routes of the vehicles substantially without distracting the drivers. Conventional navigation devices do not allow an automated route coordination and therefore require great efforts for drivers by, for example, making phone calls, to achieve a certain degree of route coordination. The present invention may also advantageously applied to other types of vehicles, as is previously pointed out, thereby increasing the safety and/or the efficiency of operating these vehicles.

FIG. 1 schematically depicts a navigation system 100 comprising a first navigation device 100A, a second navigation device 100B and a network 150. The network 150 may represent any appropriate network for wireless data communication, such as optical data transmission, radio transmission, and the like. The network 150 may include corresponding components required for the data communication. For instance the network may represent a simple radio transmission line that enables a direct connection between the first and the second navigation devices 100A, 100B. In other cases, the network 150 may represent the entire infra-structure for data communication according to generally used communication standards, as in mobile phones communication networks, and the like.

The first navigation device 100A comprises a first receiving section 101A that is configured to receive and decode signals from satellites providing positional and time relevant data relating to the precise position of the satellites. In the following a set of satellites that provide suitable signals to determine a terrestrial position with desired accuracy will be referred to as a global positioning system (GPS) irrespective of the type of satellites used. The first navigation device 100A further includes a second receiving section 102A that is configured to receive and decode data via the network 150. The second receiving section may comprise a suitably adapted interface to communicate with any network components, wherein the interface may preferably be a wireless interface enabling data exchange according to one or more communications standard. For example, the interface may be an infra-red interface to receive data from a network component, for instance from a mobile phone, a mobile computer, and the like. The interface may in other embodiments comprise a wired connector to provide connection to the network 150. In one preferred embodiment, the second receiving section 102A comprises a RF (radio frequency) stage for receiving and decoding signals transmitted by the second navigation device 100B. The term RF is to include the entirety of electromagnetic spectrum that is presently and in future available for data communication.

The first navigation device 100A further comprises a user interface 103A that is configured to allow a user to communicate with the first navigation device 100A with respect to the desired route coordination. Preferably, the user interface 103A may provide the required functionality with a minimum of activities required by the user. For instance, the user interface 103A may comprise a speech recognition system to control the operation of the first navigation device 100A or at least the part of the operation concerning the route coordination. Since the commands required for controlling the route coordination process may be low in number, a very effective and reliable voice control may be achieved. Additionally or alternatively, the user interface 103A may comprise an element for manually controlling the route coordination process.

Moreover, the first navigation device 100A comprises calculating means 104A, for example, in the form of a hardware component such as a dedicated microprocessor, or in the form of a software program running In a host computer that additionally controls further functions of a vehicle, in which the first navigation device 100A is installed. The calculating means 104A is configured to provide sufficient computational resources to determine positional data from the data received by the first and second receiving sections 101A, 102A. Preferably, the calculating means 104A also controls the user interface 103A and an output device 105A, which may provide relevant information in any appropriate form.

Transmission means 106A are connected to the calculating means 104A and are configured to provide data to the network 150. The transmission means 106A may comprise a wireless and/or a wired interface to communicate with network 150. For instance, a RF transmitter may be provided in the transmission means 106A so as to directly communicate with the second navigation device 100B. In another embodiment, the transmission means 106A may comprise, additionally or alternatively to the interface, a transmitter blocking corresponding to a mobile phone so that data communication can be performed via the networks of one or more providers of mobile phone services.

The second navigation device 100B may have substantially the same configuration as the first navigation device 100A, wherein the corresponding components are labeled with a "B".

The operation of the first and second navigation devices 100A, 100B with respect to route coordination will now be described with reference to FIG. 2.

FIG. 2 schematically depicts the various steps during a route coordination process for the first and second navigation devices 100A, 100B according to one exemplary embodiment of the present invention.

In step 210A the first navigation device 100A transmits a request signal via the network 150. The request signal may include, for example, an identification of the calling first device 100A, a specification of the type of route coordination requested, and the like. For instance, the transmission means 106A may send, upon request of the user of the first navigation device 100A entered by the user interface 103A, the request for determining a common rendezvous position of the first and second navigation devices 100A, 100B.

In step 210B, the second navigation device 100B receives the request signal at the second receiving section 102B, in which the request signal may be decoded and forwarded to the calculation means 104B. Instructed by the calculation means 104B, the request for a rendezvous may be reported to the user by the output device 105B.

In step 220B, the second navigation device 100B outputs a confirmation signal, for instance, upon user request entered through the user interface 103B. The confirmation signal may include an identification of the second navigation device 100B so as to assure that the route coordination is performed for the specified first and second navigation devices without interference from an unauthorized third party.

Simultaneously or subsequently, in step 230B information is transmitted, which may at least contain the current position of the second navigation device 100B. The information provided by the second navigation device 100B may also include further relevant data that may for, example, concern the average speed of the second navigation device 100B, and the like.

In step 220A the confirmation signal is received and decoded by the second receiving section 102A, wherein the confirmation for route coordination may be indicated to user, for example, by the output device 105A.

Simultaneously or subsequently, in step 230A the information Including the current position of the second navigation device 100B is received, decoded and supplied to the calculation means 104A.

Thereafter, in step 240A the calculation means 104A determines how to modify the route of the first navigation device 100A and of the second navigation device 100B according to the information contained in the received data. For example, the calculation means 104A determines a rendezvous position on the basis of the GPS data received by the first receiving section 101A, the position data received from the second navigation device 100B, and possibly on other criteria and parameters. Such criteria may be to select the rendezvous position such that substantially identical distances are to be covered by both vehicles, or that substantially identical time periods are required to get to the rendezvous position. However, a variety of other criteria and parameter may be used in determining the type and degree of route coordination, wherein the selection of these criteria and parameters may completely or partially be in the user's discretion. The rendezvous position may further be reported to the user of the first navigation device 100A at the output device 105A so as to allow the user to reject the proposed rendezvous position and initiate a recalculation based on different criteria and parameters.

In step 250A the positional data and possibly any additional information is output via the transmission section 106A.

In step 240B the data transmitted by the first navigation device 100A are received, decoded and supplied to the calculation means 104B by the second receiving section 102B. The calculation means 104B may present the proposed rendezvous position to the user via the output device 105B. The user may then confirm or reject the proposed rendezvous position by operating the user interface 103B.

Thus, in step 250B a confirmation signal is transmitted for agreeing to or denying the proposed rendezvous position.

In case of accepting the proposed rendezvous position, in step 260B the route of the second navigation device 100B is recalculated on the basis of the GPS data received by the first receiving section 101B and the proposed rendezvous position, which serves as a destination, at least a preliminary one, for the recalculated route of the second navigation device 100B.

In step 260A, the confirmation signal is received, decoded and analyzed. Depending on the result of the analysis, the calculation means 104A responds correspondingly. In the present example, it is assumed that the rendezvous position is accepted.

Thus, in step 270A, the calculation means 104A recalculates the route of the first navigation device 100A on the basis of the GPS data and the rendezvous position.

The above operation of the navigation devices 100A, 100B is of illustrative nature only, and may alternative procedures may be performed, in which the data communication between the navigation devices is employed to coordinate the routes thereof. For instance, it may be advantageous in the above-described sequence to update the positional data delivered by the second navigation device 100B, once a route coordination has been accepted. The update may occur in an automated manner without requiring any user interaction, wherein the actual rendezvous position may be changed according to the circumstances. In other examples, the users of the first and second navigation devices may be informed when the initially proposed rendezvous position may not be reached without violating the criteria and parameters based on which the initial rendezvous position has been accepted.

Although the navigation devices 100A, 100B are "symmetrical" with respect to their route coordination function, the calculation means 104A, 104B may be configured so as to provide a "master-slave" function, wherein one of the calculation means 104A, 104B takes on the role of the master device. For instance, the transmission of the request signal may render the corresponding navigation device the master device. As it may readily be appreciated the route coordination function may be applied to more than two navigation devices.

FIG. 3 schematically depicts a navigation system 300 comprising a plurality of navigation devices 301, 302, 303, a communication network 350 and a host unit 304. The navigation devices 301, 302, 303 may be configured in a similar fashion as is described with reference to FIG. 1 or may have any other configuration that at least allows data communication with the network 350. The network 350 may be any type of network enabling wireless data communications, and may in particular allow access to the internet. In some cases the host unit 304 may represent a master device as specified above. Preferably, the host unit may represent a computer system that provides sufficient resources to coordinate the plurality of navigation devices 301, 302, 303 even if their number is very high. The host unit may be connected to a source of information or to a service provider that supplies relevant data and services to the host unit 304.

During operation the plurality of navigation devices 301, 302, 303 may send a request signal for route coordination under predefined conditions. One example is the request for a common rendezvous point for the navigation devices 301, 302, 303. Depending on the configuration of the navigation devices 301, 302, 303, the determination of the rendezvous point and the calculation of the corresponding routes may be performed by the host unit 304, or the routes may be determined by the navigation devices 301, 302, 303 upon receipt of the rendezvous point. The routes of the navigation devices 301, 302, 303 may continuously be checked and, if desired, updated on the basis of additional information, such as information regarding traffic density, and the like. Moreover, other information may be taken into consideration that is relevant for determining a rendezvous point, such as the presence of parking lots, and the like. A further option may be the consideration of previous experiences in determining rendezvous points. For instance, the "quality" of previous rendezvous points may be evaluated and the evaluation value may describe a hierarchy for selection of rendezvous points. In this way, the system may "learn" to determine an optimum rendezvous points.

It should be noted that the above considerations also apply to the route coordination without requiring a host device.

In other examples, in times of extreme traffic density, the navigation devices 301, 302, 303 may request intermediate destinations under the condition of a minimum journey time so as to allow the navigation devices to recalculate a corresponding route on the basis of the intermediate destinations and the GPS data received. However, any other criteria may be selected depending on the abilities of the host unit 304. The host unit 304 receiving position data of the plurality of navigation devices 301, 302, 303, including the final destinations of the navigation devices 301, 302, 303, may then calculate one or more intermediate destinations for the navigation devices 301, 302, 303 and communicate the data to the navigation devices 301, 302, 303. Since the host unit 304 is informed about the destinations, the current position, the average speed, and the total number of navigation devices, the intermediate destinations may be determined so as to meet specified requirements, such as avoiding traffic jams, while substantially corresponding to the requests of the individual navigation devices 301, 302, 303. Thus, if the navigation devices 301, 302, 303 are to represent a large number of vehicles, ideally all of the vehicles are equipped with the navigation devices according to the present invention, the vehicle routes may correspondingly be coordinated, wherein the GPS ability nevertheless provides for a certain degree of independence from the host unit 304 in case data communication is interrupted or is inefficient. Moreover, the "raster" of the intermediate destinations supplied by the host unit 304 may be selected relatively coarsely since the "fine" routing is accomplished by the GPS data calculation of the individual navigation devices 301, 302, 303. The size of the "raster" with which the intermediate destinations are supplied may thus be adjusted in accordance the availability of host unit and network resources.

As a result, the present invention provides for the potentiality of route coordination of navigation devices, in particular a rendezvous function of two or more navigation devices, by exchanging at least positional data between navigation devices in a highly automated manner, thereby providing superior functionality compared to conventional navigation devices without compromising the safety in driving a vehicle.

The invention claimed is:

1. A host navigation device comprising:
 a first receiving section configured to receive via a communication network:
   a first signal indicating a current position of a first mobile navigation device and a first destination for a user of the first mobile navigation device;
   a second signal indicating a current position of a second mobile navigation device and a second destination for a user of the second mobile navigation device;
 a calculation unit configured to calculate a rendezvous position for the user of the first mobile navigation device and the user of the second mobile navigation device based on:
   the current position of the first mobile navigation device;
   the first destination;
   the current position of the second mobile navigation device; and
   the second destination, the second destination being different than the first destination;
   wherein the positions of the first and second mobile units are automatically updated without requiring any user interaction and wherein the actual rendezvous position may be changed according to the updated positions of the first and second mobile units; and
 a transmission section configured to encode the rendezvous position in an output signal transmitted via the communications network to the first mobile navigation device and the second mobile navigation device.

2. The host navigation device of claim 1 where the first receiving section and the transmission section each comprise an interface to a mobile phone.

3. The host navigation device of claim 1 where the host navigation system transmits to the first mobile navigation device a route from the present location of the first mobile navigation device to the rendezvous position.

4. A method comprising:
 receiving, from a first navigation device configured to receive and decode information to determine a current position of the first navigation device, a first set of positional data including the current position and a destination for a first user associated with the first navigation device;
 receiving, from a second navigation device configured to receive and decode information to determine a current position of the second navigation device, a second set of positional data including a current position and a destination for, a second user associated with the second navigation device, the destination of the second user being different that the destination of the first user;
 identifying a rendezvous location based at least in part upon the first positional data and the second positional data, wherein the positions of the first and second navigation devices are automatically updated without requiring any user interaction and wherein the actual rendezvous position may be changed according to the updated positions of the first and second mobile units; and
communicating at least the rendezvous location to the first user via the first navigation device and to the second user via the second navigation device.

5. The method of claim 4 wherein identifying the rendezvous location takes into account at least one criteria provided by the first user in addition to the first positional data and the second positional data.

6. The method of claim 4 wherein a route to the rendezvous location is communicated to the second navigation device.

* * * * *